Sept. 7, 1954    N. C. CUDDEBACK    2,688,343
FLEXIBLE HOSE
Filed April 3, 1948    3 Sheets-Sheet 1
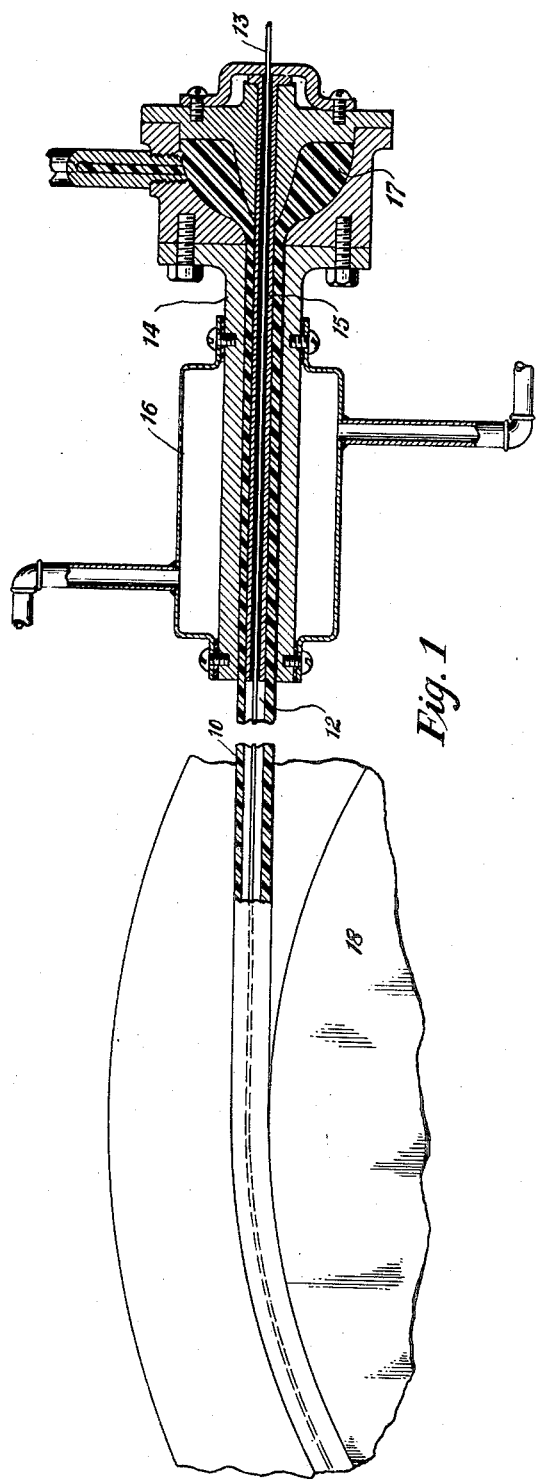
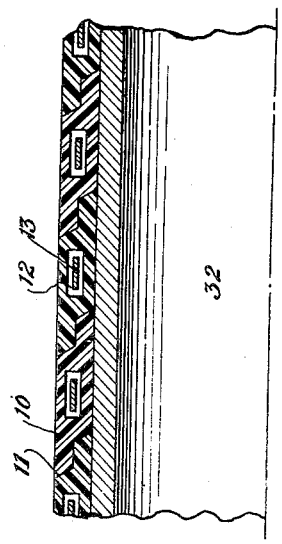
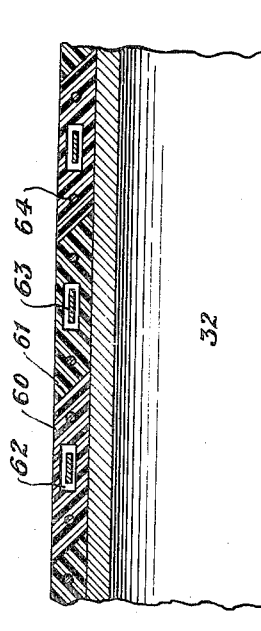
INVENTOR.
Nelson C. Cuddeback.
BY
Harry S. Drusasse
ATTORNEY.

Sept. 7, 1954   N. C. CUDDEBACK   2,688,343
FLEXIBLE HOSE
Filed April 3, 1948   3 Sheets-Sheet 3
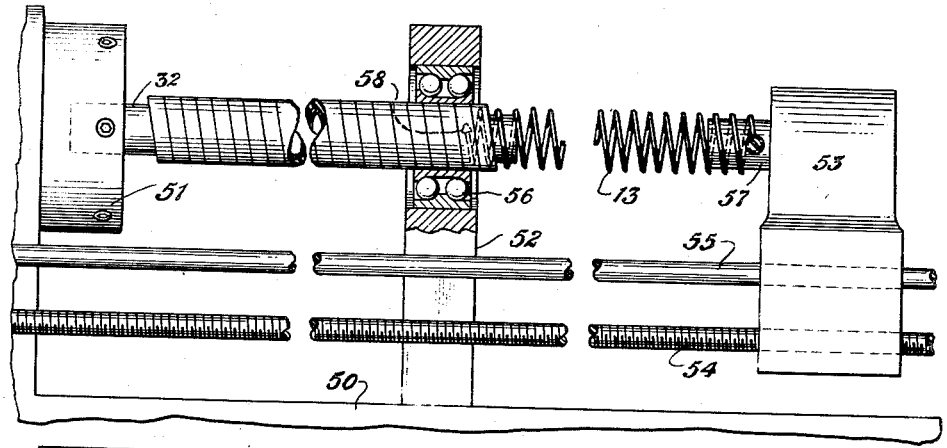
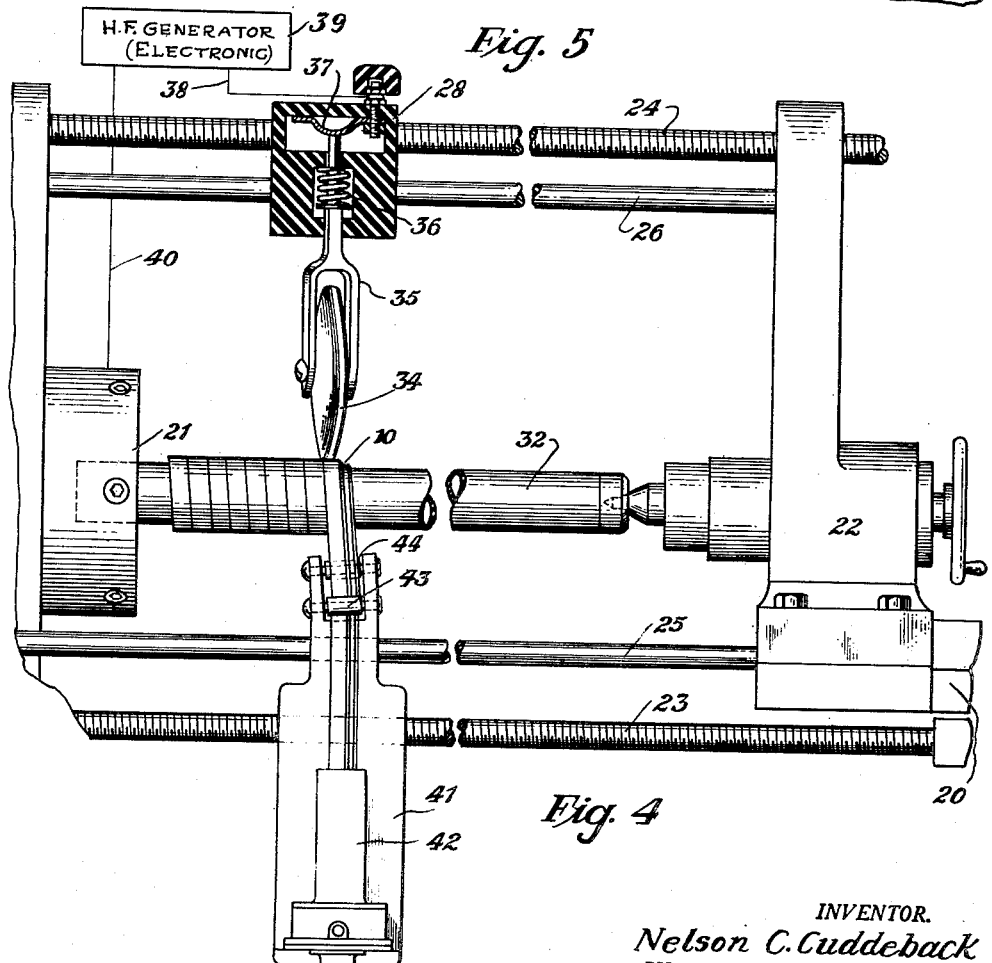
INVENTOR.
Nelson C. Cuddeback
BY
Harry S. Bunarr
ATTORNEY.

Patented Sept. 7, 1954

2,688,343

UNITED STATES PATENT OFFICE 2,688,343

FLEXIBLE HOSE

Nelson C. Cuddeback, Chicago Heights, Ill., assignor to The Hoover Company, North Canton, Ohio, a corporation of Ohio Application April 3, 1948, Serial No. 18,773

15 Claims. (Cl. 138—56)

This invention relates to flexible hose, particularly adapted for use with suction cleaners and to the method of making the same.

A hose for use with suction cleaners must be flexible for ease in manipulating the hand tools and be rigid to resist compressive forces so that it will not be collapsed when trod upon by the operator.

In order to make hose rigid to compressive forces it has been proposed to seal a reinforcing wire into the walls of the hose between two layers of thermoplastic material. In the past the reinforcing wire has been sealed in the walls of the hose so that it has no freedom of movement with the result that the hose is too rigid and unadaptable for use with a suction cleaner. Flexible hose has also been made with a reinforcing wire lying between two layers of thermoplastic material in which the reinforcing wire has freedom of movement, but the layers of thermoplastic material can also move relative to each other. If the hose liner is not secured to the covering the liner will collapse due to the low suction pressure in the hose.

According to this invention, the necessity for separate inner and outer layers is eliminated. According to one mode of operation the entire wall thickness including the inner wall and the outer wall with the reinforcing wire therebetween is formed simultaneously by a single extrusion process. The recess between the inner and outer walls in which the reinforcing wire lies is made larger than the wire to permit the wire freedom of movement so as to render the finished hose sufficiently flexible.

According to one mode of making the hose of this invention a reinforcing wire is passed through a guide tube and die of an extruding machine in which a thermoplastic material is extruded about the wire in such manner that the guide tube separates the material from the wire until it is set before leaving the tip of the guide tube and die so that the material is separated from the wire. The die is so shaped as to form a plastic strip having edges of such configuration that they will mate and overlap when the strip is wound about a mandrel.

The tape or strip thus formed may be transferred to a reel for future use and later transferred to a winding and sealing machine or it may be transferred directly to the winding and sealing machine.

In the winding and sealing machine the thermoplastic tape with the wire enclosed therein is spirally wound about a mandrel with the mating edges of the tape overlapping. Simultaneously the mating edges of the tape are heat-sealed to each other to form a hose having an integral wall with a spiral passage from end to end thereof in which the reinforcing wire is loosely positioned.

According to another mode the hose of this invention may be made by first extruding a tape of thermoplastic material as in the first mode but omitting the reinforcing wire from the passage which extends from end to end of the tape. The tape is then spirally wound on a mandrel and the mating edges heat-sealed together as in the first mode. This will form a hose having an integral wall of thermoplastic material with the helical passage extending from end to end thereof. A reinforcing wire slightly smaller in cross-section than the passage is wound on a mandrel in any suitable manner so that when tension is released the diameter of the resulting helix will be the same as the mean diameter of the helix of the passage in the hose wall. The pitch of the wire is preferably the same as that of the helical passageway.

The free end of the wire helix is then inserted into one end of the helical passageway in the hose walls and the tube and the helix rotated relative to each other so as to thread the wire through the helical passage. This will form a reinforcing hose in all respects the same as that made by the first mode.

Other objects and advantages of this invention will become apparent as the description proceeds when taken in connection with the accompanying drawings in which:

Figure 1 shows an extruding machine for forming a reinforced tape by which the hose of this invention may be made;

Figure 3 is a longitudinal cross-sectional view of the hose of this invention;

Figure 4 shows a combined extruder and winding and sealing machine in which the tape is transferred directly from the extruder to the mandrel;

Figure 5 shows one form of machine by which a preformed wire helix may be threaded into a helical passage in the walls of the hose of thermoplastic material; and Figure 6 is a cross-sectional view through a modified form of hose according to this invention.

Figure 2:
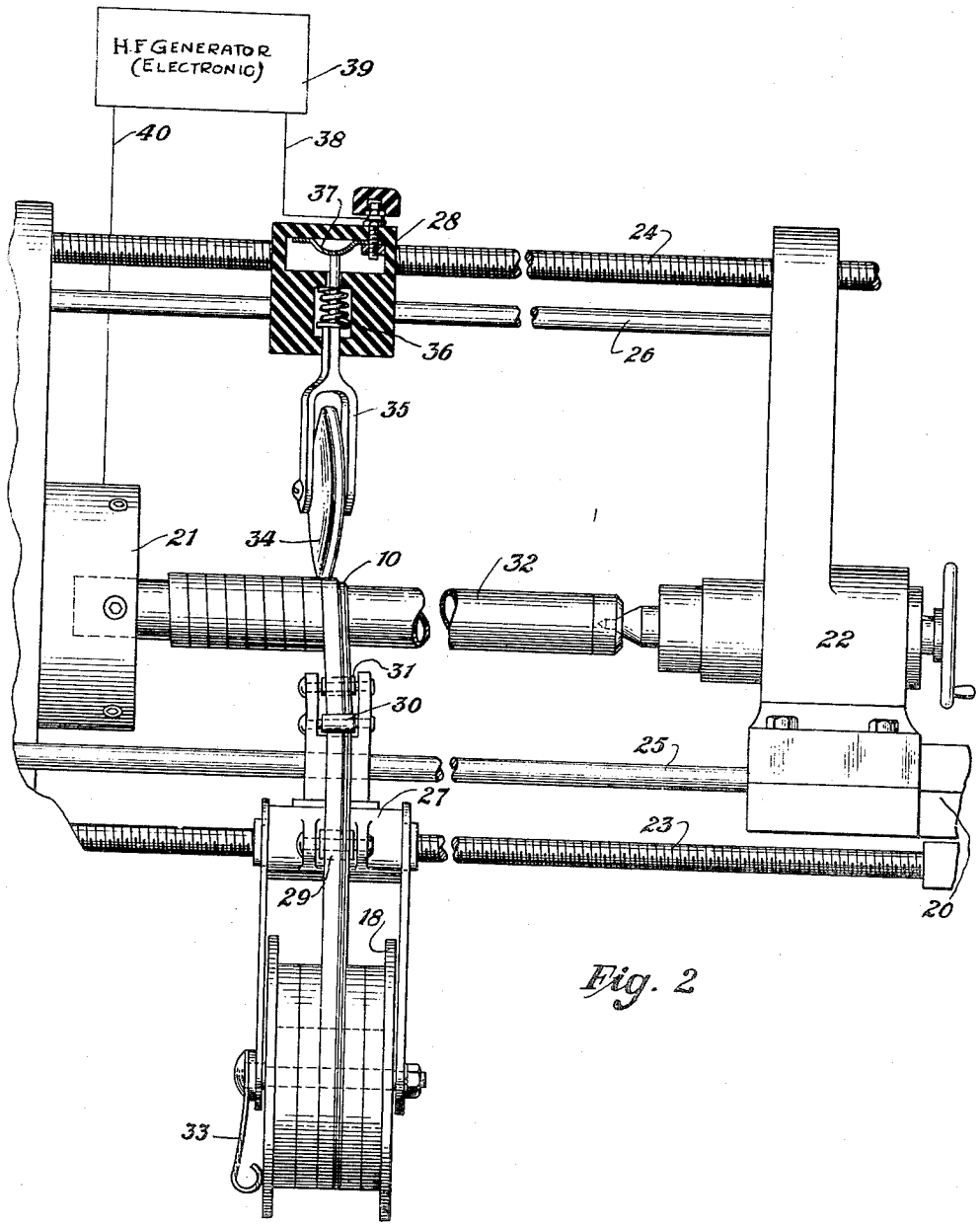
Figure 2 shows a winding and sealing machine for forming the hose of this invention from the tape formed by the extruder of Figure 1.

Referring to Fig. 3 of the drawings, the hose of this invention comprises a tape 10 having zigzag edges 11 which overlap and mate with each other when the tape is wound on a mandrel. In the finished hose the overlapping edges 11 are heat-sealed together to form an integral wall structure. The tape 10 is formed with a passage 12 in which is positioned a reinforcing wire 13 somewhat smaller in cross-section than the passage 12. The wire 13 is preferably made of relatively high strength spring steel. In the drawings, the relative cross-sectional areas of the passage 12 and the wire 13 is shown exaggerated for clarity in illustration. The relative sizes of the passage and wire may be varied to vary the flexibility of the finished hose.

The extruder of Fig. 1 comprises a female die tube 14 and a combined guide tube and male die 15. The internal passage of the female die 14 is of the same shape and size as the tape 10 desired. The internal passage of the male die 15 is of a shape and size to slidably receive the reinforcing wire 13 while its external periphery is of the same shape and size as the passage 12. A cooling jacket 16 surrounds the exterior of the female die 14.

In operation the wire 13 is fed longitudinally through the male die 15 while thermoplastic 17 is forced into the space between the male and female dies 15 and 14 respectively. As the material passes beneath the cooling jacket 16 it sets so that a space is formed between the material and the wire 13 depending upon the size of the exterior of the male die 15. The tape 10 with the wire 13 therein as it issues from the extruder may be wound upon a reel 18 for future use or it may be fed directly to a winding and sealing machine as will be explained in connection with Fig. 4.

The next step in the first mode of manufacture of the hose of this invention is carried out on the winding and sealing machine of Fig. 2. The machine comprises a bedplate 20, a rotating head 21, a tail stock 22, two lead screws 23 and 24, two guide rods 25 and 26 and two carriers 27 and 28.

The carriage 27 is carried by the screw 23 and the guide rod 25 and has provision for rotatably carrying the reel 18. Guide rollers 29, 30 and 31 are provided for the tape 10 as it is led to a mandrel 32 rotatably carried by the rotating head 21 and the tail stock 22. A brake 33 is provided for applying a retarding action to the reel 18 so as to apply the proper tension to the tape 10 as it is wound on the mandrel 32 so that the tape 10 and wire 13 will be properly coiled about the mandrel.

The carriage 28 is made of insulating material and is carried by the lead screw 24 and the guide rod 26. The pitch of the screws 23 and 24 are the same and also the same as the pitch desired for the tape 10 and wire 13. An electrode roller 34 is carried by the carrier 28 by means of a bracket 35 which is spring-pressed downwardly by a spring 36.

The end of the bracket 35 makes electrical contact with a contact member 37 connected by a line wire 38 to one side of a high frequency generator 39, the other side of which is connected to the rotating head 21 in any suitable manner. For example, the line wire 40 may be connected to a brush engaging a slip ring carried by the rotating head 21. Thus, the roller 34 forms one electrode of the high frequency generator 39 and the mandrel 32 the other while the overlapping edges of the tape 10 forms the dielectric to be heated.

In operation the reel 18 is transferred to the carriage 27 and the end of tape 10 with the wire 13 therein is threaded through the guide rollers 29, 30 and 31. The end of the tape 10 is then wound at least once about the left end of the mandrel 32 with the mating edges 11 overlapping and the electrode roller 34 applied over the overlapping edges 11. The brake 33 is then applied to the reel 18 and the motor which drives the rotating head is simultaneously energized with the high frequency generator 39.

As the mandrel 32 is rotated the carriages 27 and 28 are advanced longitudinally toward the tail stock 22 so that the tape 10 and reinforcing wire 13 are wound helically about the mandrel with the edges 11 overlapping. The electrode roller 34 advances along the overlapping edges 11 so that a high frequency field is applied to the material of the edges 11. Heat is thus produced therein and the edges 11 are heat-sealed to each other. The heat dissipating properties of the roller 34 of the mandrel 32 is such that the heat is carried away from the exterior and interior surfaces of the tape 10. As a result the tape 10 is heated to plastic condition only at the joint between the overlapping edges 11 which are heat-sealed to each other to form an integral tube wall having a helically coiled reinforcing wire 13 positioned in a helical passageway extending from one end of the hose to the other in such manner that the wire 13 has freedom of movement relative to the hose walls proper.

When the winding and sealing of the hose about the mandrel 32 is completed it is removed from the machine, the hose cut into suitable lengths and removed from the mandrel in any suitable manner.

The hose of this invention may be made by alternate methods. For example, the tape 10 with the passage 12 therein may be extruded, spirally wound and heat-sealed at the overlapping mating edges independently of the reinforcing wire 13. The wire 13 may then be spirally wound separately and threaded into the helical passageway in the hose walls thus formed. One form of apparatus for carrying out such a method is shown in Figures 4 and 5.

Referring to Fig. 4 the apparatus is similar to the machine of Fig. 2 and has been given the same reference numerals where the parts are the same. Only the modified construction will be specifically described. A carriage 41 has been substituted for the carriage 27 of Fig. 2. The carriage 41 carries an extruder 42 which is in all respects like that of Fig. 1 except that the opening in the male die 15 for the passage of the wire 13 may be omitted although this is not essential for its operation. The male die may be round or oval to receive a round or oval reinforcing wire rather than the flat wire shown in Fig. 3. The carriage 41 also carries guide rollers 43 and 44 to properly guide the tape 10 to the mandrel 32.

In operation, a short length of tape is first extruded from the extruder 42, fed through the guide rollers 43 and 44 and wound at least once about the left end of the mandrel 32 with the edges overlapping. The electrode roller 34 is then positioned over the overlapping edges 11. The extrusion will then be continued simultaneously with the energization of the high frequency generator 39 and of the motor which drives the rotating head 21. A hose will be formed as in the apparatus of Fig. 2 except that the reinforcing wire 13 is omitted. The integral hose wall thus formed has a helical passageway 12 therein extending from one end to the other.

After the hose is formed on the mandrel 32 the mandrel is transferred to the machine of Fig. 5 which comprises a bedplate 50, a rotating head 51, a steady rest 52 carried by the bedplate 50 and a carriage 53 carried by a lead screw 54 and a guide rod 55. The lead screw 54 is geared to the rotating head 51 and has a pitch the same as that of the spiral passageway in the hose walls. A bearing 56 receives the outer end of the hose and mandrel to rotatably support them within the steady rest 52. The carriage 53 carries a wire holder 57 to which is rigidly secured one end of a previously wound helical wire 13. This wire is preferably wound on a mandrel smaller than the mean diameter of the helical passageway 12 in the hose wall so that when the tension is released the wire will expand to a diameter the same as that of the mean diameter of the passage 12.

The cross section of the wire 13 is smaller than that of the passage 12 so that a guide mouse 58 may be positioned over the free end of the helix and inserted in the end of the helical passageway 12. The motor which drives the head 51 is then energized so as to simultaneously rotate the mandrel and advance the carriage 53 towards the head while the wire is held against rotation. This will cause the wire 13 to advance and be threaded into the helical passageway 12. After the operation is completed the mandrel 32 and completed hose is removed, the hose cut to suitable lengths and removed from the mandrel in any suitable manner.

According to the second mode the wire 13 and passage 12 can be circular or oval in configuration while according to the first mode the wire 13 and passageway 12 are preferably flat so that when the tape is wound on the mandrel 32 the wire 13 will have less tendency to cut through the walls of the tape 10.

A modified form of hose according to this invention is shown in Fig. 6. According to this modification the hose comprises a helical tape 60 having diagonal mating edges 61 heat-sealed to each other, a helical passageway 62 having a helically wound reinforcing wire 63 therein and electric conducting wires 64 embedded in the walls of the tape 60 on each side of the passageway 62.

The tube of Fig. 6 may be made in the same way as in that of Fig. 3 except that the extruding machine would have additional guide tubes for the conducting wires 64 so positioned relative to the female die that the thermoplastic material will flow completely about the wires 64 so as to embed them in the walls of the tape 60 as it is formed.

The tube of Fig. 6 is especially useful where an electrical adjunct is mounted on the end of a suction hose since the electrical energy can be transmitted to the adjunct by means of the conducting wires 64.

While I have shown but a number of modifications of my invention it is to be understood that these modifications are to be taken as illustrative only and not in a limiting sense. I do not wish to be limited to the particular structure and method shown and described but to include all equivalent variations thereof except as limited by the scope of the claims.

It is to be understood that the protection herein applied for is not confined to the particular combinations of features or elements set out in the following claims. Protection is herein applied for for any one or more of the features or elements referred to in the following claims, or described in the foregoing specification or shown in the accompanying drawings, either independently or in combination.

I claim:

1. A flexible hose comprising, a cylindrical wall formed of a spirally wound single thickness thermoplastic tape bonded together between its adjacent convolutions and having a helical passageway therein extending from one end thereof to the other, and a reinforcing wire positioned in said passageway, the relative size of said passageway and wire being such that said wire has freedom of movement in said passageway, said cylindrical wall comprising a helically wound tape of thermoplastic material having mating laterally extending fins in overlapping relationship with each other and sealed together to form an integral wall.

2. The method of manufacturing a hose which comprises forming a strip comprising a continuous rib having fins along its longitudinal edges from elastomeric composition, winding said strip spirally with the fins of adjacent turns overlapping, and fusing the fins together by the application of heat to form an integral structure.

3. The method of manufacturing a hose which comprises forming a strip comprising a continuous rib having fins along its longitudinal edges from elastomeric composition, winding said strip spirally with the fins of adjacent turns overlapping, and electronically sewing said fins together to form an integral structure.

4. The method of manufacturing a hose which comprises forming a strip comprising a continuous rib having fins along its longitudinal edges from elastomeric composition, winding said strip spirally with the fins of adjacent turns overlapping, and simultaneously fusing the fins together by the application of heat to form an integral structure.

5. The method of manufacturing a hose which comprises forming a strip comprising a continuous rib having fins along its longitudinal edges from elastomeric composition, winding said strip spirally with the fins of adjacent turns overlapping, and simultaneously electronically sewing said fins together.

6. The method of manufacturing hose which comprises extruding elastomeric composition around a reinforcing member to provide a continuous strip comprising a reinforced rib having fins on its longitudinal edges, winding said strip spirally with the fins of adjacent turns overlapping, and fusing the fins together by the application of heat to form an integral structure.

7. The method of manufacturing hose which comprises extruding elastomeric composition around one or more reinforcing wires to provide a continuous strip comprising a wire reinforced rib having fins on its longitudinal edges, winding said strip spirally with the fins of adjacent turns overlapping, and fusing the fins together by the application of heat to form an integral structure.

8. The method of manufacturing hose which comprises extruding elastomeric composition around one or more reinforcing wires to provide a continuous strip comprising a wire reinforced rib having fins on its longitudinal edges, winding said strip spirally with the fins of adjacent turns overlapping, and simultaneously fusing the fins together by the application of heat to form an integral structure.

9. The method of manufacturing hose which comprises extruding elastomeric composition around one or more reinforcing wires to provide a continuous strip comprising a wire reinforced rib having fins on its longitudinal edges, winding said strip spirally with the fins of adjacent turns overlapping, and simultaneously electronically sewing said fins together to form an integral structure.

10. The method of manufacturing a flexible hose which comprises forming strips comprising a continuous rib having fins along its longitudinal edges from elastomeric composition, the fins being relatively thin as compared to the thickness of the rib, winding such strips spirally with the fins of adjacent turns overlapping, and fusing the fins together by the application of heat to form an integral structure.

11. The method of manufacturing a flexible hose which comprises extruding elastomeric composition around a reinforcing member to provide a continuous strip comprising a reinforced rib having relatively thin fins on its longitudinal edges, winding said strips spirally with the fins of adjacent turns overlapping, and fusing the fins together by the application of heat to form an integral structure.

12. The method of manufacturing a flexible hose which comprises extruding elastomeric composition around a reinforcing member to provide a continuous strip comprising a reinforced rib having relatively thin fins on its longitudinal edges, said fins being offset relatively to each other by an amount equal substantially to their thickness, winding said strips spirally with the fins of adjacent turns overlapping, and fusing the fins together by the application of heat to form an integral structure.

13. The method of manufacturing flexible hose which comprises extruding elastomeric composition around one or more reinforcing wires to provide a continuous strip comprising a wire reinforcing rib having relatively thin fins on its longitudinal edges, winding said strips spirally with the fins of adjacent turns overlapping, and fusing the fins together by the application of heat to form an integral structure.

14. The method of manufacturing a hose which comprises forming a strip comprising a continuous rib having fins along its longitudinal edges from elastomeric composition, and with a reinforcing member encased in the rib, winding such strip spirally with the fins of adjacent turns overlapping, and fusing the fins together by the application of heat to form an integral structure.

15. The method of manufacturing a flexible hose which comprises forming strips comprising a continuous rib having fins along its longitudinal edges from elastomeric composition, the fins being relatively thin as compared to the thickness of the rib and with a reinforcing member encased in the rib, winding such strips spirally with the fins of the adjacent ribs overlapping and fusing the fins together by the application of heat to form an integral structure.

References Cited in the file of this patent

UNITED STATES PATENTS

| Number | Name | Date |
|---|---|---|
| 132,006 | Harris | Oct. 8, 1872 |
| 133,219 | Gately | Nov. 19, 1872 |
| 1,088,311 | Wheeler | Feb. 24, 1914 |
| 1,252,109 | Heckman | Jan. 1, 1918 |
| 1,314,670 | Juve et al. | Sept. 2, 1919 |
| 1,394,300 | Gommeter | Oct. 18, 1921 |
| 1,625,983 | Carter | Apr. 26, 1927 |
| 1,632,398 | Franks | June 14, 1927 |
| 1,661,069 | Hartung | Feb. 28, 1928 |
| 1,746,701 | Kimmich | Feb. 11, 1930 |
| 1,974,285 | MacLachlan | Sept. 18, 1934 |
| 2,137,887 | Abbott | Nov. 22, 1938 |
| 2,291,670 | Wiley | Aug. 4, 1942 |
| 2,321,064 | Broedling | June 8, 1943 |
| 2,337,373 | Chernack | Dec. 21, 1943 |
| 2,364,962 | Eagles | Dec. 12, 1944 |
| 2,405,909 | Smith | Aug. 13, 1946 |
| 2,440,668 | Tarbox | Apr. 27, 1948 |
| 2,486,387 | Bringolf | Nov. 1, 1949 |
| 2,517,672 | Jenkins | Aug. 8, 1950 |
| 2,630,157 | Smellie | Mar. 3, 1953 |

FOREIGN PATENTS

| Number | Country | Date |
|---|---|---|
| 346,639 | Great Britain | Apr. 16, 1931 |

OTHER REFERENCES

Hoyler, An Electronic "Sewing Machine," reprint, August 1943, issue Electronics.